United States Patent Office 3,468,683
Patented Sept. 23, 1969

3,468,683
DOLOMITIC CONTAINING REFRACTORIES AND PROCESS OF PRODUCING THE SAME
Daniel Montgomery, Tiffin, Ohio, assignor to Basic Incorporated, Cleveland, Ohio, a corporation of Ohio
No Drawing. Filed Nov. 3, 1966, Ser. No. 591,707
Int. Cl. C04b 35/06
U.S. Cl. 106—56                           9 Claims

ABSTRACT OF THE DISCLOSURE

A dolomitic containing refractory and a process of producing such a refractory in which a relatively small quantity of elemental sulfur is blended with a carbonaceous binding agent and the dolomitic containing grains. The blend of ingredients is then formed into a refractory shape and subsequently tempered.

---

This invention relates generally as indicated to dolomitic containing refractories and to a process for producing the same, and more particularly to such refractories which have significantly improved resistance to hydration.

In the oxygen steel making process, a basic slag is produced which accordingly makes it necessary to utilize a refractory lining for the furnace of basic composition. This has led to the widespread use both in the United States and in Europe of refractory brick of dead-burned dolomite or dead-burned dolomite-magnesia mixtures bonded with a carbonaceous material such as a tar or pitch.

Magnesia and dolomite possess great refractoriness, particularly such materials of high purity, and are therefore capable of withstanding the exceedingly high temperatures encountered in the oxygen converter process. Dolomite is a particularly desirable constituent of the refractory for economical reasons and also because it has good resistance to attack by high lime slags. It is also quite well known, however, that lime is extremely susceptible to hydration from moisture in the atmosphere, and this has tended to restrict its use as a refractory material.

Various attempts have been made to improve the hydration resistance of dolomitic containing refractories, including the use of certain additives, as for example, clay, silica, or iron oxide. Although such stabilizing agents tend to improve the hydration resistance of the dolomitic refractory, they adversely affect the refractoriness to such an extent that they are generally not satisfactory.

The hydration resistance of dolomitic containing refractories has also been improved by coating the grains or the formed body with a carbonaceous material such as tar or pitch. When brick or other refractory shapes which have been produced in this manner are heated to temperatures above about 1200° F., the pitch or tar is pyrolytically decomposed, or coked, to form a carbon residue which strongly bonds the refractory grains together. Thus, the coating of pitch or tar excludes the moisture of the atmosphere and provides protection against hydration as well as bonding the grains into a strong body.

As long as the carbon bond of refractories produced in this manner is left intact, it is effective at elevated temperatures of 3000° F. or higher. The bonding action of the carbon is lost only when the carbon itself is destroyed by oxidation, as for example at the high operating temperatures of the steel making furnace when the iron oxides of the molten slag react with the carbon to form carbon monoxide or carbon dioxide as the slag comes in contact with the refractory body.

Moreover, when pitch or tar bonded refractory shapes are used directly in the steel making furnace, there is a period during the ensuing heating to steel making temperatures when the pitch softens and at least the interior surface of the brick becomes weak upon exposure to the heat of the furnace. This condition is exaggerated if the furnace is heated up slowly thus permitting deep penetration of the heat to the interior surface of the bricks and may cause the entire lining of the furnace to fail.

Because of the rather delicate condition of such refractory bricks or other shapes, it has been the practice to give the green pitch bonded brick a baking or tempering at low temperature prior to installation in the furnace in order to reduce the necessity for such careful control of the preliminary heating during operation of the furnace. During such treatment, the shapes are commonly heated to temperatures on the order of 250 to 1000° F. and are held at such temperatures for a period of time of approximately 1 to 200 hours, preferably from about 20 to 50 hours. In such tempering, part of the more volatile components of the pitch or tar are driven off, and it is believed that a partial polymerization of the remaining components occurs to form a hydrocarbon mixture with a much higher softening point.

Although the tempering operation improves the strength of the dolomitic containing refractories as well as the resistance to hydration, such protection is only temporary, and hydration remains a serious problem to the industry, particularly during certain times of the year when the humidity of the atmosphere is higher.

It is a principal object of the present invention therefore to provide a dolomitic containing refractory and a process of producing the same in which such refractories have markedly improved resistance to hydration.

It is an additional object of the present invention to provide a dolomitic containing refractory which has improved durability and resistance to the attack of slags in steel making furnaces.

It is a still further object of the present invention to provide a dolomitic refractory which has a significantly improved resistance to hydration when exposed to the humidity of the ordinary atmosphere such as during storage, transportation and installation in the furnace.

It is another object to provide a dolomitic containing refractory which exhibits an increase in its hot crushing strength.

Other objects, features and advantages of this invention will become apparent after a reading of the following more detailed description of the invention.

These and other objects are achieved by means of this invention in which a dolomitic containing refractory is formed by blending relatively small quantities of elemental sulfur with a carbonaceous binding agent and the dolomitic containing grains. After thoroughly admixing such ingredients, the admixture is formed into the desired shape, and tempered. It has been found that such refractories have significantly increased resistance to hydration and also demonstrate an increase in hot crushing strength, as will be demonstrated by the illustrative examples which follow.

As indicated, this invention may be used with dolomitic containing refractories such as dolomite or dolomite-magnesia refractories. Such dead-burned refractory grains are generally crushed, sized and blended into a mixture which gives a compacted product of high density with the variously sized grains fitting closely together and finely powdered grains filling the smaller interstices. The grains are heated to a suitable temperature above the softening point of the carbonaceous bonding agent to facilitate coating therewith.

The carbonaceous material which can be used in this invention is one which leaves a carbon residue when subjected to pyrolytic decomposition or cracking. When this occurs, a carbon film is formed around and among the granular refractory particles by the cracking of the carbonaceous material and bonds the particles together. Such carbon film formation typically may occur inwardly from an exposed surface of the refractory as when the refractory is used in a steel making furnace. Preferably, the carbonaceous materials employed are pitches and especially those derived from coal tar. Such coal tar pitches may have softening points varying between approximately 40° C. to about 110° C. (ASTM Method of Test D-36-26). Coal tar itself may also be suitable for bonding of refractory grains, although in general coal tar pitch is preferred since it is essentially free of the lower boiling constituents ordinarily found in coal tar. Similarly, some of the bituminous asphalts may be used provided they are capable of pyrolytically decomposing to form a substantial carbon residue.

Only a sufficient quantity of carbonaceous material is used to bind the refractory grains together and to provide the desired coating. In general, this will be a quantity of approximately 2 to about 10% by weight, based on the total weight of the refractory admixture.

The hot refractory grains are normally first placed in a suitable mixer and molten pitch, tar, etc. added thereto If desired, the coarser grains of the refractory can be coated first with molten pitch and the fine grains subsequently blended into the mixture.

The mixer can be of any type which will give adequate blending as for example Muller mixers or single or double shafted pug mills. The mixing time will, of course, vary considerably but will normally be from approximately 6 to about 15 minutes.

The desired quantity of sulfur is also added to this admixture and may be added to the dry refractory grains, after such grains have been coated with pitch, or added to the molten pitch prior to mixing with the refractory grains. As mentioned, only a relatively small quantity of sulfur is used, which may be amorphous or crystalline, solid or liquid in form, normally in the range of approximately 0.01 to about 2.0% by weight, based on the total weight of the admixture. It has been found that particularly effective results are obtained if the quantity is kept within the range of approximately 0.2 to approximately 0.7% by weight, with extremely good results being obtained with the use of approximately 0.25 weight percent.

Other additives may also be included in the admixture, such as carbon black (see U.S. Patent 3,236,664), graphite or hard pitch.

The pitch bonded refractory shapes containing sulfur can be formed into the desired shape by any practical means of consolidation such as tamping, ramming, vibration compaction or by pressing in either a hydraulic or mechanical press. One suitable such means is the toggle lever mechanical press. Pressures of approximately 6000 to 20,000 p.s.i. may be used to obtain the desired pressed densities.

After formation, the refractory shapes are generally placed on pallets to facilitate convenient movement without deformation to a tempering or baking oven. In such ovens, the shapes are heated for approximately 12 to 60 hours, preferably from 24 to 32 hours at temperatures preferably ranging between about 400 to 600° F., although temperatures within the range of 250 to 1000° F. may be used. The preferred tempering temperatures are in the range of about 450 to 550° F.

This invention will be better understood by reference to the following specific but non-limiting examples.

EXAMPLE I

A dead-burned dolomite was used in this example, which consisted of 41.5 weight percent MgO and 57.7 weight percent CaO, with the remainder being silica, iron oxide and aluminum oxide. The batch for this example consisted of a coarse fraction of —3/8" and smaller grain and a fine fraction blended to give a closely packed mass. The refractory grains were heated to approximately 250° F. in a dryer, and the coarse fraction was then placed into an electrically heated Simpson mixer.

Approximately 4.5 weight percent of coal tar pitch having a softening point of 80° C. was then added to the mixer, and the coarse fraction and the pitch were mixed for approximately 1 minute. The fine material was thereafter added along with approximately 2.0 weight percent of carbon black, and this was mixed for an additional 2 minutes. Finely divided sulfur, which was purchased commercially from C. P. Hall Company, was then added in varying amounts, as indicated in the following table, and the mixing was continued to a total mixing time of approximately 15 minutes.

9" x 4½" x 3" bricks were pressed from the heated mix on a hydraulic press, and the bricks were subsequently tempered at different temperatures and for differing periods of time as shown in the following table. Certain of the tempered bricks were cut into segments to give a more complete evaluation of the resistance of the refractory to atmospheric hydration.

The hydration resistance was measured by noting the appearance of the sample during exposure to the atmosphere. In cases where no change was noted after a lengthy interval, the brick was placed into a humidity cabinet for an accelerated determination of such resistance at a temperature of about 96° F. and a relative humidity maintained at 70%.

The hot crushing strength of the tempered bricks is set forth in Table 1, and the hydration measurements are set forth in Table 2 which follow.

TABLE 1

EXAMPLE I

| Sulphur (wt. percent of pitch) | 0 | 0 | 0 | 0 | 0 | 0 |
|---|---|---|---|---|---|---|
| Tempering temp., ° F | 450 | 450 | 450 | 550 | 550 | 550 |
| Tempering time, hrs | 16 | 32 | 48 | 16 | 32 | 48 |
| Hot crush strength at 450° F | 280 | 430 | 430 | 260 | 300 | 430 |
| Sulphur (wt. percent of pitch) | 5 | 5 | 5 | 5 | 5 | 5 |
| Tempering temp., ° F | 450 | 450 | 450 | 550 | 550 | 550 |
| Tempering time, hrs | 16 | 32 | 48 | 16 | 32 | 48 |
| Hot crush strength at 450° F | 2,640 | 4,770 | 4,960 | 2,860 | 4,920 | 6,330 |
| Sulphur (wt. percent of pitch) | 10 | 10 | 10 | 10 | 10 | 10 |
| Tempering temp., ° F | 450 | 450 | 450 | 550 | 550 | 550 |
| Tempering time, hrs | 16 | 32 | 48 | 16 | 32 | 48 |
| Hot crush strength at 450° F | 2,310 | 2,630 | 4,010 | 1,280 | 4,160 | 2,800 |
| Sulphur (wt. percent of pitch) | 15 | 15 | 15 | 15 | 15 | 15 |
| Tempering temp., ° F | 450 | 450 | 450 | 550 | 550 | 550 |
| Tempering time, hrs | 16 | 32 | 48 | 16 | 32 | 48 |
| Hot crush strength at 450° F | 2,910 | 4,610 | 4,560 | 3,200 | 2,410 | 5,360 |

EXAMPLE II

| Sulphur (wt. percent of pitch) | 0 | 0 | 0 | 5 | 5 | 5 |
|---|---|---|---|---|---|---|
| Tempering temp., ° F | 550 | 550 | 550 | 550 | 550 | 550 |
| Tempering time, hrs | 24 | 32 | 48 | 24 | 32 | 48 |
| Hot crush strength at 450° F | 1,640 | 2,650 | 4,150 | 2,620 | 3,540 | 5,060 |

EXAMPLE III

| Carbon black | 2 | 2 | 2 | 2 | 2 | 2 |
|---|---|---|---|---|---|---|
| Sulphur (wt. percent of pitch) | 0 | 0 | 0 | 5 | 5 | 5 |
| Tempering temp., ° F | 550 | 550 | 550 | 550 | 550 | 550 |
| Tempering time, hrs | 24 | 32 | 48 | 24 | 32 | 48 |
| Hot crush strength at 450° F | 250 | 295 | 345 | 920 | 850 | 720 |

TABLE 2
EXAMPLE I

| Percent sulfur | Tempering Temp., °F. | Tempering Time, hrs. | Date exposed to atmosphere | Date failed | Date removed for accelerated test | Hrs. in hot pack 90° F., 70% rel. hum. where failure noted |
|---|---|---|---|---|---|---|
| 0 | 450 | 16 | 1/4 | 2/17 | | |
| 0 | 450 | 32 | 1/5 | 2/20 | | |
| 0 | 450 | 48 | 1/6 | 2/23 | | |
| 0 | 550 | 16 | 1/11 | 3/4 | | |
| 0 | 550 | ¹32 | 1/12 | 2/17 | | |
| 0 | 550 | ¹48 | 1/12 | 2/19 | | |
| 5 | 450 | 16 | 1/4 | | 3/12 | 24 |
| 5 | 450 | 32 | 1/5 | | 3/12 | 32 |
| 5 | 450 | 48 | 1/6 | | 3/12 | 32 |
| 5 | 550 | 16 | 1/11 | | 3/12 | 24 |
| 5 | 550 | ¹32 | 1/12 | (²) | (²) | |
| 5 | 550 | ¹48 | 1/12 | | (²) | |
| 10 | 450 | 16 | 1/4 | | 3/12 | 22 |
| 10 | 450 | 32 | 1/5 | | 3/12 | 30 |
| 10 | 450 | 48 | 1/6 | | 3/12 | 44 |
| 10 | 550 | 16 | 1/11 | | 3/12 | 24 |
| 10 | 550 | ¹32 | 1/12 | | (²) | |
| 10 | 550 | ¹48 | 1/12 | | (²) | |
| 15 | 450 | 16 | 1/4 | | 3/12 | 16 |
| 15 | 450 | 32 | 1/5 | | 3/12 | 24 |
| 15 | 450 | 48 | 1/6 | | 3/12 | 40 |
| 15 | 550 | 16 | 1/11 | | 3/12 | 16 |
| 15 | 550 | ¹32 | 1/12 | | (²) | |
| 15 | 550 | ¹48 | 1/12 | | (²) | |

¹ Brick cut into cubes prior to exposure.
² Intact as of 4/25.

EXAMPLE II

| Sulfur (percent of pitch) | Percent carbon black | Tempering time, hrs. | Date exposed to atmosphere | Date failed |
|---|---|---|---|---|
| 0 | 0 | 24 | 8/1 | 8/15 |
| 0 | 0 | 32 | 8/1 | 8/15 |
| 0 | 0 | 48 | 8/1 | 8/4 |
| 5 | 0 | 24 | 8/1 | 8/21 |
| 5 | 0 | 32 | 8/1 | 8/22 |
| 5 | 0 | 48 | 8/1 | 8/24 |

EXAMPLE III

| Sulfur (percent of pitch) | Percent carbon black | Tempering time, hrs. | Date exposed to atmosphere | Date failed |
|---|---|---|---|---|
| 0 | 0 | 24 | 7/19 | 8/1 |
| 0 | 0 | 32 | 7/19 | 8/1 |
| 0 | 0 | 48 | 7/19 | 8/1 |
| 5 | 0 | 24 | 7/19 | 8/15 |
| 5 | 0 | 32 | 7/19 | 8/9 |
| 5 | 0 | 48 | 7/19 | 8/21 |
| 5 | 2 | 24 | 7/19 | 8/17 |
| 5 | 2 | 32 | 7/19 | 8/17 |
| 5 | 2 | 48 | 7/19 | 8/21 |
| 0 | 2 | 24 | 7/19 | 8/9 |
| 0 | 2 | 32 | 7/19 | 8/15 |
| 0 | 2 | 48 | 7/19 | 8/15 |

EXAMPLE II

In this example, the general procedure of Example I was followed, but the addition of carbon black was omitted, and the pressed bricks were 9″ x 6″ x 3″. The processing was otherwise the same, including the tempering times and temperatures. The hot crushing strength and hydration resistance of the samples of this example are shown in the foregoing tables.

EXAMPLE III

In this example, a dead-burned dolomite-magnesia mixture was used consisting of approximately 65.9% MgO and 32.8% CaO, with the remainder consisting of silica, iron oxide and alumina. The general procedure of Examples I and II was followed, the refractory being admixed with approximately 4% by weight of 80° C. pitch, 2 weight percent carbon (in certain samples) and varying quantities of sulfur as shown in the table. After tampering, the resistance of the 9″ x 6″ x 3″ bricks to hydration was determined as well as the hot crushing strength. These results are shown in the foregoing tables.

EXAMPLE IV

To demonstrate further the significantly improved results of the present invention, additional tests were conducted using the dolomitic material of Example I. The procedure of Example I was also followed including the carbon addition, except that the bricks were 9″ x 6″ x 3″ in size. The crushing strength and hydration results are shown in Tables 3 and 4.

TABLE 3

| Percent sulfur (wt. percent of pitch) | 0 | 0 | 0 | 0 | 1 | 1 | 1 | 1 |
|---|---|---|---|---|---|---|---|---|
| Tempering temperature, °F | 450 | 450 | 450 | 550 | 450 | 450 | 450 | 550 |
| Tempering time, hrs | 16 | 32 | 48 | 16 | 16 | 32 | 48 | 16 |
| Hot crushing, 450° F | 215 | 225 | 275 | 305 | 370 | 405 | 380 | 370 |

| Percent sulfur (wt. percent of pitch) | 2 | 2 | 2 | 2 | 3 | 3 | 3 | 3 |
|---|---|---|---|---|---|---|---|---|
| Tempering temperature, °F | 450 | 450 | 450 | 550 | 450 | 450 | 450 | 550 |
| Tempering time, hrs | 16 | 32 | 48 | 16 | 16 | 32 | 48 | 16 |
| Hot crushing, 450° F | 300 | 365 | 370 | 410 | 560 | 655 | 820 | 700 |

TABLE 4

| Sulfur, percent | Tempering temp., °F. | Tempering time, hrs. | Original date of exposure | Date hydration noted |
|---|---|---|---|---|
| 0 | 450 | 16 | 3/11 | 3/26 |
| 0 | 450 | 32 | 3/11 | 3/30 |
| 0 | 450 | 48 | 3/11 | 4/2 |
| 1 | 450 | 16 | 3/11 | 4/6 |
| 1 | 450 | 32 | 3/11 | 4/18 |
| 1 | 450 | 48 | 3/11 | 4/21 |
| 2 | 450 | 16 | 3/11 | 4/11 |
| 2 | 450 | 32 | 3/11 | 4/21 |
| 2 | 450 | 48 | 3/11 | 4/23 |
| 3 | 450 | 16 | 3/11 | 4/24 |
| 3 | 450 | 32 | 3/11 | (¹) |
| 3 | 450 | 48 | 3/11 | (¹) |

¹ Not hydrated.

From an analysis of the foregoing results, it will be appreciated that the resistance to hydration of the refractory bricks produced in accordance with the present invention has been increased significantly and that the hot crush strength of such bricks has also been increased. For example, tempered bricks of Example IV produced without sulfur were seriously hydrated in 15 days whereas similar bricks containing only approximately 0.135 weight per cent sulfur (3 percent of the pitch) showed hydration only at the end of 44 days.. Other specimens with cut surfaces (Table 2), which generally hydrate more rapidly than uncut surfaces, containing only small quantities of sulfur remained intact for a period of 103 days during January, February, March and April.

Other modes of applying the principle of the invention may be employed, change being made as regards the details described, provided the features stated in any of the following claims, or the equivalent of such, be employed.

I therefore particularly point out and distinctly claim as my invention:

1. A process of producing a dolomitic refractory comprising admixing dead-burned dolomite containing refractory grains selected from the group consisting of dolomite and dolomite-magnesia mixtures with a carbonaceous binding material capable of undergoing pyrolytic decomposition and with approximately 0.01 to about 2% by weight, based on the total weight of the admixture, of elemental sulfur, forming such admixture into a refractory shape, and subsequently tempering such refractory shape at a temperature within the range of approximately 250 to about 1000° F.

2. The process of claim 1 in which approximately 0.2 to about 0.7% by weight of sulfur is used.

3. The process of claim 2 in which approximately 0.25 weight percent of sulfur is used.

4. The process of claim 1 in which such refractory shape is tempered at a temperature within the range of approximately 400 to 600° F. for approximately 12 to about 60 hours.

5. The process of claim 4 in which said carbonaceous material is selected from the group consisting of pitch, coal tar and bituminous asphalts.

6. The process of claim 1 in which carbon black is included in such admixture.

7. A refractory article of manufacture comprising dead-burned dolomite containing refractory particles selected from the group consisting of dolomite and dolomite-magnesia mixtures, sufficient carbonaceous material capable of undergoing pyrolytic decomposition to bind said dolomitic containing particles together and approximately 0.01 to about 2.0 weight per cent, based on the total weight of said refractory, of elemental sulfur.

8. The refractory article of claim 7 in which carbon black is included.

9. The process of claim 1 in which such tempered refractory shape is subsequently further heated to produce a carbon bonded refractory.

References Cited

UNITED STATES PATENTS

| | | | |
|---|---|---|---|
| 3,189,668 | 6/1965 | Miller | 106—58 |
| 3,199,995 | 8/1965 | King et al. | 106—58 |
| 3,236,664 | 2/1966 | Wilson. | |

JAMES E. POER, Primary Examiner

U.S. Cl. X.R.

106—58, 61, 63, 70